Oct. 26, 1971    J. G. F. DOORNEKAMP ET AL    3,615,140
APPARATUS FOR MEASURING THE REFRACTIVE INDEX OF A SOLUTION
IN ROTATING CENTRIFUGE CELLS
Filed Nov. 7, 1969    4 Sheets-Sheet 1

INVENTORS
JOHAN G. F. DOORNEKAMP
BAUKE S. SIESWERDA
BY
Cushman, Darby & Cushman
ATTORNEYS

United States Patent Office 3,615,140
Patented Oct. 26, 1971

3,615,140
APPARATUS FOR MEASURING THE REFRACTIVE INDEX OF A SOLUTION IN ROTATING CENTRIFUGE CELLS
Johan G. F. Doornekamp and Bauke S. Sieswerda, Geleen, Netherlands, assignors to Stamicarbon N.V., Heerlen, Netherlands
Filed Nov. 7, 1969, Ser. No. 874,908
Claims priority, application Netherlands, Nov. 8, 1968, 6815905
Int. Cl. G01n 21/24
U.S. Cl. 356—197
10 Claims

ABSTRACT OF THE DISCLOSURE

An apparatus for measuring the refractive index of a solution in a rotating centrifuge provided with a multicell rotor and with a selector circuit for observing a given cell with application of a light source continuously omitting radiation and a motor-operated rotary disc, serving as a gate, whose speed of revolution is derived from that of the rotor, both the rotor and the disc being equipped with means for the generation of pulses with a frequency that is directly proportional to the number of revolutions and wherein use is made of an electronic controller which feeds the disc drive with pulses of a frequency equal to that of the rotor pulses, unless said motor is rotating at too high a speed, while in the case of a synchronous or lagging speed of revolution the time duration of the pulses to be fed to the motor is reduced by the pulses generated by the disc, in so far as the latter pulses come within the time duration of the pulses to be fed to the motor, and the disc is coupled with a damper for the suppression of rotational vibrations.

---

The invention relates to an apparatus for measuring the refractive index of a solution in a rotating centrifuge provided with a multi-cell rotor and a selector circuit for observing a given cell with application of a light source continuously omitting radiation and a motor-operated rotary disc, serving as a gate, whose speed of revolution is derived from that of the rotor.

Efforts at operating a centrifuge in this way have been unsuccessful so far, because the rotations of the disc and the rotor could not be synchronized with sufficient accuracy. Makeshift arrangements, such as flashing light sources, static gates, etc. all have their drawbacks. They cannot be used at widely varying speeds of revolution, and, moreover, are too complicated and expensive, or cannot readily be adjusted at the cell to be viewed.

The invention offers an adequate solution in which use is made of a rotary disc.

According to the invention both the rotor and the disc are equipped with means for the generation of pulses with a frequency that is directly proportional to the number of revolutions, and use is made of an electronic controller which feeds the disc drive motor with pulses of a frequency equal to that of the rotor pulses, unless said motor is rotating at too high a speed, while in the case of a synchronous or lagging speed of revolution the time duration of the pulses to be fed to the motor is reduced by the pulses generated by the disc, in so far as the latter pulses come within the time duration of the pulses to be fed to the motor, and the disc is coupled with a damper for the suppression of rotational vibrations.

The invention comprises a combination of measures which are all equally essential.

According as, after being set in motion, the disc is rotated at a speed which approaches ever more closely to the rotor speed, more and more of the transmitted pulses will undergo a reduction in time duration. When the disc is rotating in synchronism with the rotor, the time duration of all pulses is reduced. When the disc is turning too fast, no pulses will be transmitted anymore. The damper for suppressing the rotational vibrations, i.e. the beat of the disc around the correct phase, is an essential component, because a beat with an amplitude of only a few degrees renders observation of the cells impossible. It is recommendable to provide the controller with means for blocking the rotor pulses as soon as the disc generates only one pulse too many per unit time. This ensures that the disc will at any moment adjust itself with extreme accuracy to the motion of the rotor.

The damper preferably consists of a cylindrical box which is fitted, concentrically and rotatably, on the shaft of the disc and is filled, at least partly, with a liquid or some other finely divided material, while in said box a number of blades are fixedly mounted on the shaft. In such a damper, movements of box and blades are suppressed under the influence of the frictional losses.

The damper may, however, also be of a different design in which use is made, for example, of induction-current damping (Ferraris principle).

The pulses may be generated by optical-electrical means, in which case one light path leads from a light source to a photodetector through a hole in the rotor, and a second path from a light source to a photodetector through a hole in the disc. This implies that the rotor and the disc are not mechanically loaded. The disc and its accessories may be combined to form an integral unit; coupling this unit to and disconnecting it from an existing centrifuge is a matter of a few seconds, even during operation, because the essential parts of the centrifuge need not be interfered with.

A phase shift of the disc for the purpose of selecting an arbitrary cell can be achieved by mechanical coupling of the light source and the photodetector for the second light path and shifting them concentratically in relation to the disc.

If two successive holes include an angle of say 60° and the disc has only one hole, the second light path will also have to be shifted through 60° to permit observation of a following cell. It is advantageous, however, to provide the disc with more than one hole, which should then be equally spaced and be disposed at equal distances to the shaft. If the disc has, say, 20 holes, the speed of the disc should be $\frac{1}{20}$ of the rotor speed. The disc drive can thus be simplified. The second light path need then be shifted through no more than $\frac{1}{20} \times 60° = 3°$ to permit observation of a following cell.

For indicating the cell under observation at a given moment, use could be made of the position of the means for the second light path. A direct electrical indication, however, is much more desirable.

This can be obtained by means of a third light path, which, from a fixed light source, leads through a hole in the disc to a fixed photodetector, in which case the signals from the photodetectors of the first and third light paths are supplied to a phase difference meter. The meter indication for a given cell corresponds to the current intensity pertaining to that cell.

There is no need of constructing a hole for the first light path in the rotor, because use can be made of one of the two openings present in one of the cells—the "reference cell"—on either side of the reference edges defining the boundary lines of the diagram to be recorded.

The invention will now be elucidated by means of the figures shown in the drawing.

Figure 1:
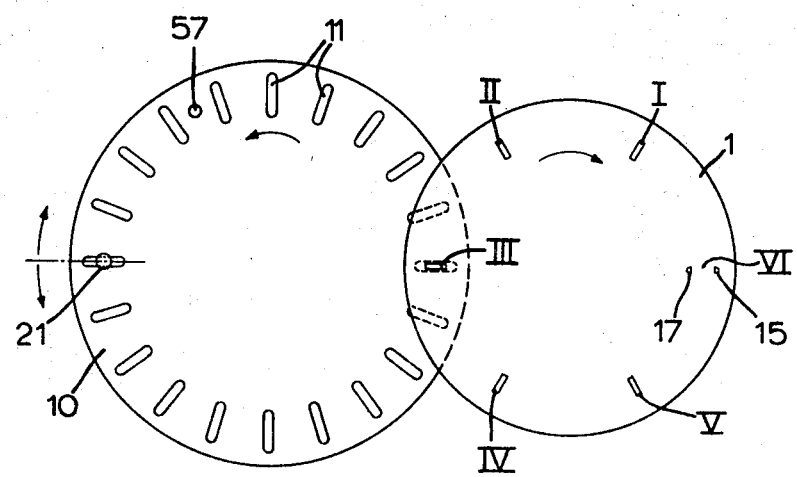
FIG. 1 shows a schematic top view of rotor and disc.
Figure 2:
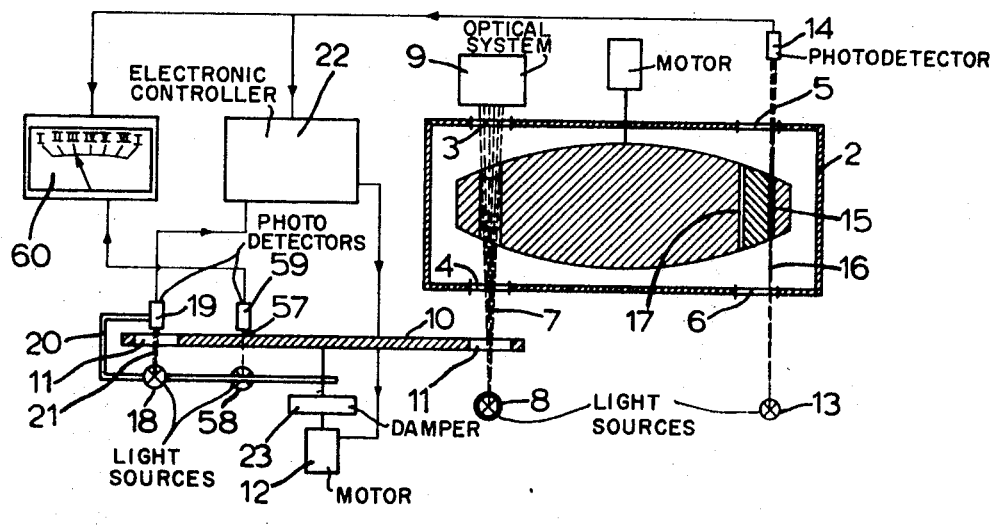
FIG. 2 shows a schematic cross-section through rotor and disc and further, the principal components needed for the invention.

Rotor 1 of an ultracentrifuge has six holes, i.e. five (I–V) in which cells containing the liquids to be centrifuges can be placed, and one (VI) for the "reference cell." The rotor is accommodated in a heavy vacuum tank 2 (FIG. 2), which is provided with two pairs of windows, 3, 4 and 5, 6. A light path 7, leading from a lamp 8 to an optical system 9, intersects the path of the cells. The moment a cell is in light path 7, the refractive index as a function of the distance to the centre of rotation can be established by means of the optical system. Although the cell remains in the light path for an extremely short time only, the light images of the cell over a time unit are summated, with the result that the total amount of light per unit time, which is independent of the number of revolutions, suffices for making visual and photographic observations.

The measures according to the invention relate to the selection of a given cell that has to be viewed. But for these measures, examination of more than one liquid would hardly be possible, owing to overlapping of the five cell images. This possibility of selection is obtained by means of a disc 10, placed in light path 7, which is provided with twenty holes 11 passing through the light path 7. The disc is driven synchronously with rotor 1 by means of a motor 12, but at a twenty times lower speed. If, for example, cell III intersects the light path 7 together with a given hole in the disc 10, said cell will, after one revolution of rotor 1, intersect light path 7 together with the following hole in the disc. In the meanwhile the other holes have also passed through the light path but in this period the light path was blocked by the disc.

Means for generating the synchronisation pulses coming from the rotor consist of a light source 13, a photodetector 14, the windows 5 and 6 and an opening 15, which intersects the light path 16. Opening 15 is provided in cell VI which serves as a "reference cell." This cell has two openings 15 and 17, the outer one of which is disposed at a slightly greater, and the inner one at a slightly smaller distance from the rotor centre than the outer and inner edges respectively of the cells I–V.

Means for generating the pulses coming from the disc 10 consist of a light source 18 and a photodetector 19, both of which are disposed on an arm 20 that can be rotated through a small angle around the shaft of disc 10, so that the light path 21 remains within the path of the holes 11.

When the rotor and the disc are in synchronism (see above), the pulses emitted by the detectors 14 and 19 have the same frequency. An electronic controller 22 compares the pulse frequencies of the two detectors, as well as their phase difference (FIG. 4), and controls the drive motor 12 of disc 10 in such a way that this will run synchronously with rotor 1, with preservation of a small phase difference $\delta$ between the pulse trains.

It will be obvious that the disc needs a short starting-up time during initial operation. Unless use is made of a damper 23, the disc will usually tend to oscillate at the end of this period with the result that synchronisation becomes difficult if not impossible.

Figure 3:
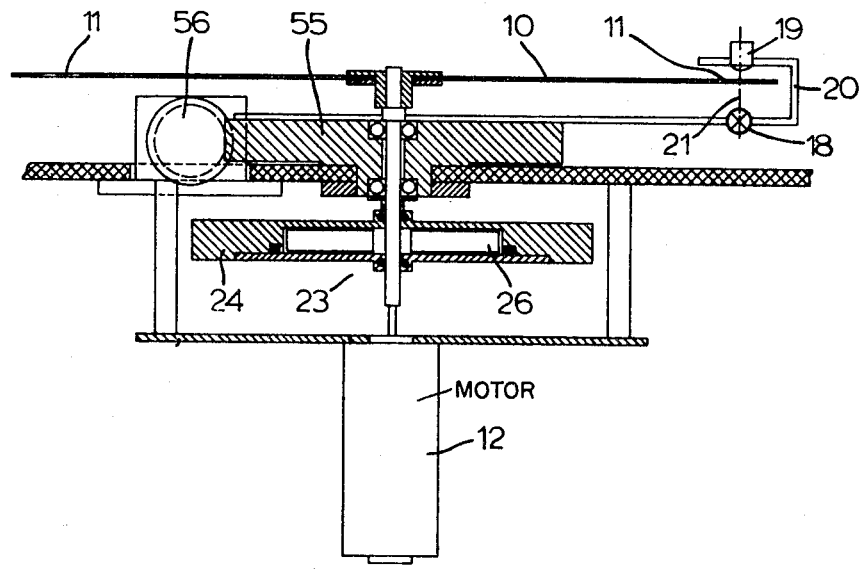
FIG. 3 is a cross-sectional view of the disc with accessories.

Damper 23 (FIG. 3) suppresses these oscillations. It consists of a cylindrical box 24 which is adapted to rotate freely on shaft 25 of the disc. In the present case the inertia moment ($GD^2$) of the disc is approximately equal to that of the disc 10. The box is filled with a liquid. The box further comprises a number of blades 26, which are fixedly mounted on shaft 25. The energy of the oscillation, which is superposed on the stationary speed of rotation of the disc, is absorbed by the liquid.

Controller 22 is so designed that the power input of motor 12 does not vary in amplitude, but is determined by the duration of the power impulses, whose frequency corresponds to the rotor speed. During synchronous operation of disc and rotor, controller 22, feeds power pulses of constant width to motor 12. These pulses are started by pulses from detector 14 and terminated by pulses from detector 19. The phase difference between the pulse trains from the detectors 14 and 19 consequently determines the power input of the motor. In this way an appropriate control is obtained.

Figure 4:
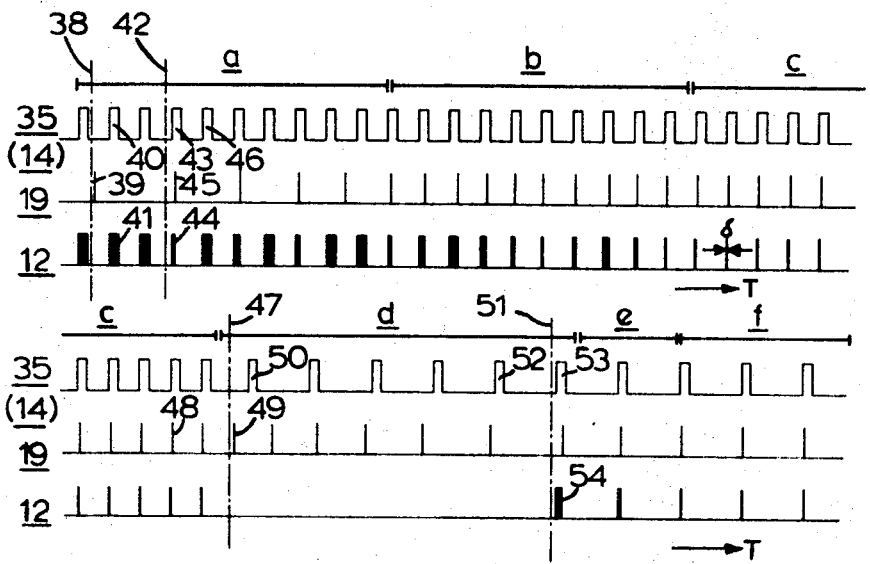
FIG. 4 shows the pulse trains from the rotor and the disc, and the pulse trains supplied to the disc motor.

The following situations are conceivable (see FIG. 4).

(a) Disc 10 is stationary and controller 22 is cut in. Every pulse from detector 19 coming within the time duration of a pulse emitted by detector 14 and stretched by pulse stretcher 35, limits the time duration of the pulses fed to motor 12; the other stretched pulses from detector 14 are allowed to pass in unchanged form, so that disc 10 rapidly attains its operational speed.

(b) The disc and rotor 1 are not yet completely in synchronism. The time durations of substantially all pulses fed to the motor 12 are limited, but the pulses still differ in time duration.

(c) The disc and rotor 1 are "in synchronism." The time duration of the pulses to the motor 12 is constant and equal to $\delta$.

(d) The speed of rotor 1 is reduced, with the consequence that disc 10 will at first rotate at too high a speed; not a single pulse is transmitted until the disc has slowed down sufficiently.

(e) This situation is comparable to situation b.

(f) This situation corresponds to situation c.

Figure 5:
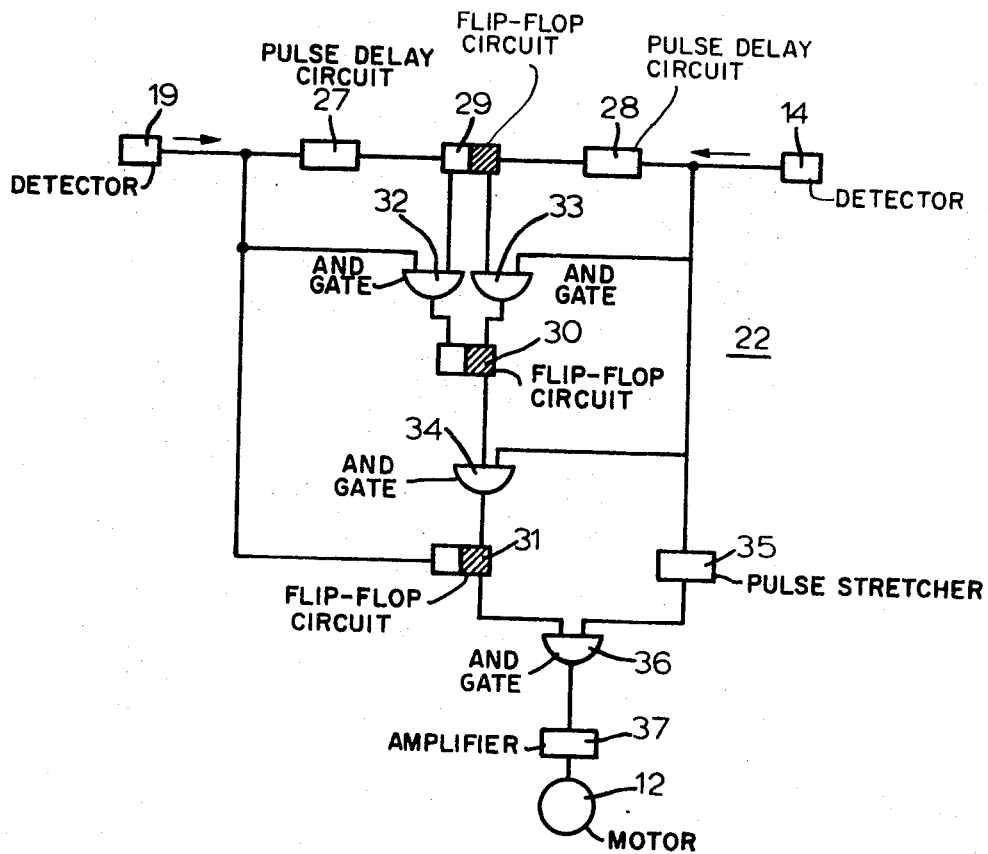
FIG. 5 is a block diagram of the wiring system.

In FIG. 5 the following components of controller 22 are indicated: delay units 27 and 28, multivibrators (flip-flops) 29, 30 and 31, and gates 32, 33, 34 and 36, pulse stretcher 35 and amplifier 37.

The operation of the controller will be elucidated with reference to the situations at some moments indicated in FIG. 4.

Moment 38.—After this moment there arrives a pulse 39 from detector 19, which, via pulse delay circuit 27 and flip-flop 29, opens gate 32 to any further pulses coming from detector 19. Pulse 39 also triggers flip-flop 31. Via delay 28 and flip-flop 29, the following pulse (40, unstretched) from detector 14 opens gate 33 to any following pulses from detector 14. The unstretched pulse consequently cannot pass on to flip-flop 30. However, this had not been triggered by pulse 39, so that the unstretched pulse 40 can pass on to flip-flop 31 via gate 34. Flip-flop 31 is triggered, and the pulse reaches gate 36. The unstretched pulse 40 also reaches the gate via stretching unit 35, from where it can pass on, as pulse 41, to amplifier 37 and motor 12.

Moment 42.—After this moment there arrives a pulse (43, unstretched), which triggers flip-flop 31; this starts the feed of pulse 44 to motor 12. The subsequent pulse, 45, however, triggers flip-flop 31 and, thereby closing gate 36, ends pulse 44. The following pulse, 46, comes from detector 14, so that the delayed opening of gate 32 has no effect.

Moment 47.—The last pulse was pulse 48 from detector 19, which terminated the feed of a pulse to motor 12. Via delay unit 27 and flip-flop 29, pulse 48 has opened gate 32 to any subsequent pulses from detector 19. The following pulse, 49, comes again from detector 19. Via gate 32, this pulse triggers flip-flop 30. The following pulse 50 comes from detector 14. Via delay 28 and flip-flop 29, this pulse (unstretched) opens gate 33 to any subsequent pulses from detector 14. The unstretched pulse 50 cannot pass through gate 34, because flip-flop 30 was triggered by pulse 49. Now, gate 36 does not receive any pulse from flip-flop 31, and, in consequence, no pulse is passed on to motor 12. The situation persists until shortly after moment 51.

Moment 51.—After this moment there arrives a pulse 53 (unstretched) from detector 14. This pulse was preceded by pulse 52, likewise from detector 14. Pulse 52 had opened gate 33. Pulse 53 can now pass on to open the gate 34, and can reach this gate via flip-flop 31. Consequently a pulse (54) is passed on to motor 12.

A shift of light path 21, which is achieved by rotation of arm 20, changes the phase difference δ (FIG. 4). This causes the controller to vary the speed of the disc until the phase difference is again equal to δ. The result is that in the new situation the disc is again running synchronously with the rotor, and that, depending on the amount of the shift, a different point on the rotor coincides with a hole of the disc in light path 7. If the new position of light path 21 has been properly chosen, this point may be, for example, hole II. Shifting light path 21 is done by turning arm 20 by means of a wormwheel 55 and a worm 56.

Figure 6:
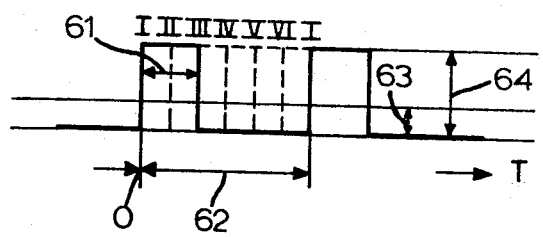
FIG. 6 shows a pulse train fed to a phase-difference meter.

A separate measuring system provides information on which cell is being viewed. A third light path 57, passing through the holes 11 of disc 10, is present between a light source 58 and a photodetector 59, both of which are mounted in a fixed position. A phase difference meter 60 measures the phase difference between the pulses from detector 14 and the pulses from detector 59. The phase difference meter comprises a gate circuit, which causes a constant current cupply to the motor to be cut in by the pulses from detector 14 and to be cut out by pulses from detector 59. The pulse width 61 may thus vary from 0 to 62 (FIG. 6) or, in other words, from 0° and 360°, and the average current intensity 63, to which the meter deflection is proportional, from 0 to 64.

The position of the light path 57 has been so chosen that when cell I is being viewed, the phase difference equals 0°, while upon selection of the reference cell, the phase difference changes to 300°. The result of displacing light path 21 over a distance equal to ⅙ of the pitch of the holes 11 is that cell II instead of cell I comes under observation. The corresponding phase difference equals 60°. Since the electrical and mechanical losses of the disc plus accessories are not proportional to the speed of revolution the phase difference δ between rotor and disc must be greater at high than at low speeds. Upon a change-over to another speed, the arm 20 must therefore be shifted again. The phase-difference meter immediately indicates the deviation and the cell selection can, at any rotor speed, be carried out with very great accuracy by shifting the arm 20.

To permit exact interpretation of the photographic shots, the optical measuring result for a given cell must be photographed together with the image of the reference cell. This means that a double shot must be taken of the selected cell and the reference cell, which is not at all objectionable.

During the aging process of the samples in the cells, disc 10 need not be operated.

The appartus satisfies all relevant conditions, and the invention means a considerable improvement, which can be easily embodied in existing centrifuges.

We claim:

1. An apparatus for measuring the refractive index of a solution in rotating centrifuge cells comprising a rotor, a plurality of transparent cells containing the solution to be measured circumferentially attached at a common radius to said rotor, a motor for rotating said rotor, a light source adapted to be aligned with any one of said plurality of cells and an optical system located on the opposite side of said plurality of cells from said light source and optically aligned therewith whereby the refractive index of said solution can be measured, and a disc which overlaps at least that portion of said rotor to which said cells are attached, said disc being rotatably mounted on a shaft and having at least one window, mounted in optical alignment with said cells, and control means for controlling and proportioning the speed of said disc with respect to the speed of said rotor whereby said window is rotated into optical alignment with said light source and optical system only when a single one of said plurality of transparent cells is also rotated into said optical alignment.

2. The apparatus as claimed in claim 1, wherein said control means comprises a second motor which drives said disc, a first electrical signal generator for producing pulses proportional to said rotational speed of said rotor, a second electrical signal generator for producing pulses proportional to the said rotational speed of said disc and a control circuit means for comparing the signals from said first and second generators to control said second motor.

3. The apparatus as claimed in claim 2, wherein said first and second signal generator means are of an optical electrical nature, said first signal generator comprising a second light source and a first photodetector in optical alignment through the windows of said rotor and said second signal generator comprising a third light source and a second photodetector.

4. The apparatus as claimed in claim 3, further including selector means to change said second signal whereby a second transparent cell is substituted in optical alignment for said first transparent cell.

5. The apparatus as claimed in claim 4, wherein said third light source and said second photodetector are mechanically coupled and are shifted concentrically with respect to said disc to change said second signal.

6. The apparatus as claimed in claim 4, further including means for determining which transparent cell is in optical alignment.

7. The apparatus as claimed in claim 6, wherein said determining means comprises a first electro-optical signal generator associated with said rotor, a third electro-optical signal generator associated with said disc, a comparator circuit for comparing the outputs of said generators and an indicator for displaying which transparent cell is in optical alignment.

8. The apparatus as claimed in claim 2, wherein said disc is provided with more than one window, said windows being equally spaced angularly and disposed at an equal distance to the shaft.

9. The apparatus as claimed in claim 1, further including a damper mechanically connected to said disc for the suppression of rotational vibrations.

10. The apparatus as claimed in claim 9, wherein said damper comprises a cylindrical housing which is fitted concentrically and rotatably on said shaft, said housing enveloping a plurality of blades fixedly mounted on said shaft as well as viscous material.

References Cited

UNITED STATES PATENTS 2,883,900  4/1959  Svensson _____ 350—273

FOREIGN PATENTS 1,145,388  3/1963  Germany.

RONALD L. WIBERT, Primary Examiner

O. B. CHEW II, Assistant Examiner

U.S. Cl. X.R.

250—218